(12) United States Patent
Chanan

(10) Patent No.: US 12,078,214 B2
(45) Date of Patent: Sep. 3, 2024

(54) INTELLIGENT CLUTCH (i-CLUTCH) SYSTEM FOR AN AUTOMOBILE VEHICLE

(71) Applicant: UMEANDUS TECHNOLOGIES INDIA PRIVATE LIMITED, Gurgaon (IN)

(72) Inventor: Rajeev Chanan, Gurgaon (IN)

(73) Assignee: UMEANDUS TECHNOLOGIES INDIA PRIVATE LIMITED, Gurgaon (IN)

(*) Notice: Subject to any disclaimer, the term of this patent is extended or adjusted under 35 U.S.C. 154(b) by 0 days.

(21) Appl. No.: 18/011,386

(22) PCT Filed: May 29, 2021

(86) PCT No.: PCT/IN2021/050525
§ 371 (c)(1),
(2) Date: Dec. 19, 2022

(87) PCT Pub. No.: WO2021/255749
PCT Pub. Date: Dec. 23, 2021

(65) Prior Publication Data
US 2023/0235797 A1 Jul. 27, 2023

(30) Foreign Application Priority Data
Jun. 19, 2020 (IN) .............................. 202011025987

(51) Int. Cl.
*F16D 48/06* (2006.01)

(52) U.S. Cl.
CPC .... *F16D 48/06* (2013.01); *F16D 2500/10412* (2013.01); *F16D 2500/3108* (2013.01);
(Continued)

(58) Field of Classification Search
CPC .......... F16D 48/06; F16D 2500/10412; F16D 2500/3108; F16D 2500/31426; F16D 2500/3144
See application file for complete search history.

(56) References Cited

U.S. PATENT DOCUMENTS 9,410,584 B2 * 8/2016 Maeda ............ B60W 30/18072
10,500,953 B2 * 12/2019 Yamamoto .............. F16D 48/06

FOREIGN PATENT DOCUMENTS

| CN | 205190569 U | 4/2016 |
|---|---|---|
| CN | 111237359 A | 6/2020 |
| JP | S62238124 A | 10/1987 |

OTHER PUBLICATIONS

International Search Report; PCT/IN2021/050525, Date Sep. 17, 2021, by: Authorized Officer: Prakash Raushan.

* cited by examiner

*Primary Examiner* — Huan Le
(74) *Attorney, Agent, or Firm* — Greenberg Traurig, LLP

(57) ABSTRACT

A method for optimizing kinetic energy for an automobile, using an intelligent clutch (i-clutch) system, comprises dynamically receiving, at a controller [210], one or more parameters from at least one of a braking pressure sensor [202], a speed sensor [204] and an acceleration pressure sensor [206] of the automobile. Next, the controller [210] continuously determines an operating condition of the automobile based on the received one or more parameters. Subsequently, the controller [210] generates a trigger based on the determined operating condition of the automobile to activate an intelligent clutch (i-clutch) [212]. Lastly, the i-clutch [212] disconnects a prime mover and a driving shaft of the automobile, by disconnecting a transmission of the automobile and the driving shaft, to optimize kinetic energy of the automobile.

17 Claims, 11 Drawing Sheets

(52) U.S. Cl.
CPC .............. *F16D 2500/31426* (2013.01); *F16D 2500/3144* (2013.01)

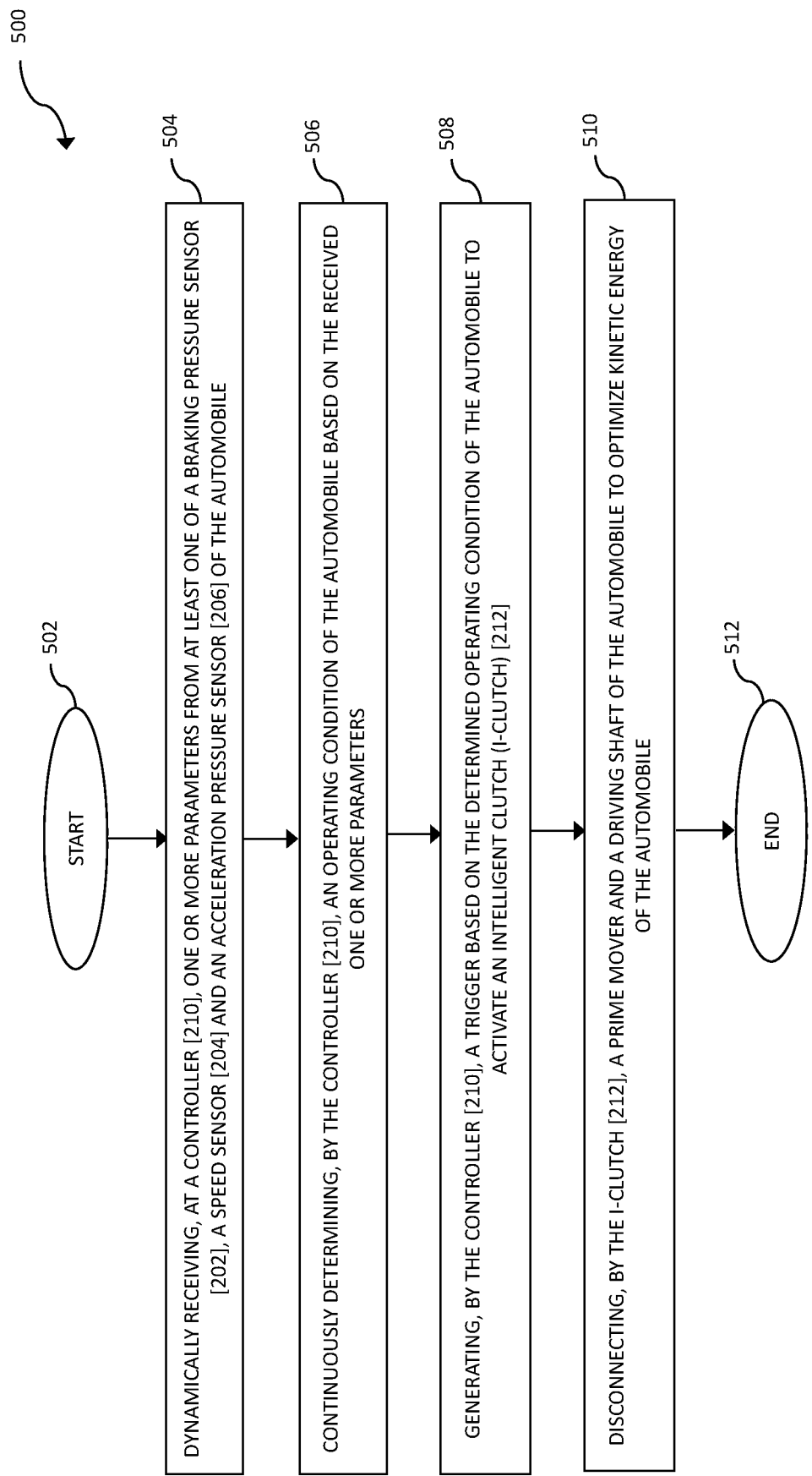

INTELLIGENT CLUTCH (i-CLUTCH) SYSTEM FOR AN AUTOMOBILE VEHICLE

CROSS-REFERENCE TO RELATED APPLICATIONS

This application is the U.S. National Stage application, pursuant to 35 U.S.C. § 371, of PCT International Patent Application No. PCT/IN2021/050525, filed May 29, 2021, designating the United States and published in English, which claims priority under 35 U.S.C. §§ 119 and 365 to Indian Patent Application No. 202011025987, filed Jun. 19, 2020. The contents of each of the aforementioned applications are incorporated herein by reference in their entirety.

FIELD OF THE INVENTION

Embodiments of the present invention generally relates to automobiles. More particularly, the embodiments of the present invention relate to a system and a method for optimizing kinetic energy for the automobiles and an intelligent clutch (i-Clutch) system for automobiles thereof.

BACKGROUND

The following description of related art is intended to provide background information pertaining to the field of the invention. This section may include certain aspects of the art that may be related to various features of the present invention. However, it should be appreciated that this section be used only to enhance the understanding of the reader with respect to the present invention, and not as admissions of prior art.

Most automobiles propelled by an internal combustion engine and fueled by the combustion of fossil fuels or operating on electricity provided by batteries or hydrogen fuel cells or any other kind of fossil fuels, dissipate kinetic energy during braking. Braking is a complex process. Braking is used to perform either reduction in speed of automobiles to reach at lower speed or to stop. During braking, kinetic energy of automobiles is converted into friction, which also produces a lot of heat energy which is ultimately wasted into the environment. There exist some solutions to conserve this kinetic energy from being wasted in the heat energy where automobiles are configured to recapture this kinetic energy and store the same in flywheels, or chemical energy in batteries for later use. Although stored energy in flywheels reduces demand of power in engines and results in less fuel consumption, however, such automobiles are expensive and also require high maintenance cost. Similarly, in electric vehicles, some of the kinetic energy is captured by electrical vehicles in charging batteries on board during the braking of the electric vehicle. However, electric vehicle face limitation in recovering the kinetic energy at slower speeds as regeneration in electric vehicles is not available at slow speed, and most frequent braking occurs in congested roads and cities at lower speeds.

Traffic congestion is characterized by retardation in speeds of automobiles, delay in trips and increasing queues. As the traffic congestion increases, the driver of a vehicle is prone to more frequent braking. Frequent braking, thus, results in early wear and tear of automobiles which leads to more frequent repairs and replacement as well as dissipation of kinetic energy. None of the existing solutions, thus, provides a solution for capturing as much kinetic energy as possible before getting wasted in the friction during such frequent braking. Further, different driving surface conditions can affect driving. Further, none of the existing solutions provide a system in automobile for maximizing fuel efficiency by reducing wastage of kinetic energy in the friction and drag created by automobile itself. The existing systems on-board an automobile which are responsible for generating acceleration have drag which needs to be overcome before the power reaches the wheels for moving the vehicle. This becomes a huge drag on the vehicle and creates retardation when driver or prime mover is not powering the drive shaft.

While the foregoing solutions provide limited respite, they fail to address the problem of optimizing usage of kinetic energy of a moving automobile to minimize its wastage. In view of the existing limitations, there is an imperative need to provide improved solutions for maximize fuel efficiency of automobiles by reducing wastage to kinetic energy. More particularly, there's a need for a system and a method for maximizing kinetic energy usage for such automobiles, with an i-clutch (Intelligent Clutch) system for automobiles thereof.

SUMMARY OF THE INVENTION

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide a system and method for kinetic energy optimization for automobiles. Another object of the present invention is to provide an i-clutch system for automobiles thereof. Yet another object of the present invention is to maximize usage of kinetic energy of all types of automobiles including internal combustion, hybrid, electrical or hydrogen fuel cell vehicles into useful work of covering distance. Yet another object of the present invention is to achieve this without conversion into chemical or electrical energy on the automobiles before getting wasted in friction energy. Yet another object of the present invention is to provide optimization and stability for automobiles by automatic operation the invention within safe operating speed limits of the i-clutch as per design of the specific vehicle. Yet another object of the present invention is to increase efficiency of the automobiles especially during retardation and driving in the congested areas plagued with frequent braking. Yet another object of the present invention is to add intelligence and automation to the vehicles by i-clutch which operates automatically by capturing operating conditions of the vehicle and driving pattern of the driver for maximizing fuel efficiency by reducing wastage of kinetic energy. Yet another object of the present invention is to provide control to the driver for vehicle operated by a driver on board or by central control centre if the vehicle is an autonomous vehicle without driver. Yet another object of the present invention is that i-clutch operates automatically sensing various conditions like accelerator paddle, Brake Paddle and Limits of speed for safe operations for the particular vehicle. Yet another object of the present invention is to introduce an intelligent & automatic clutch system (i-Clutch) as a secondary clutch in an automobile fitted with a manual clutch. The i-clutch operates independent of the manual clutch and the two clutch systems do not depend on each other. Yet another object of the present invention is to introduce the i-clutch in an automobile which are without a clutch, to optimize the kinetic energy.

Furthermore, in order to achieve the aforementioned objectives, the present invention provides an intelligent clutch (i-clutch) system for an automobile and a method for optimizing kinetic energy for an automobile. A first aspect of the present invention relates to an intelligent clutch (i-clutch) system for an automobile, said i-clutch system comprising a controller connected to at least one of a braking pressure sensor, a speed sensor and a acceleration pressure sensor of the automobile. Said controller is configured to dynamically receive one or more parameters from at least one of the braking pressure sensor, the speed sensor and the acceleration pressure sensor. The controller is also configured to continuously determine an operating condition of the automobile based on the received one or more parameters. The controller is also configured to generate a trigger based on the determined operating condition of the automobile to activate an intelligent clutch (i-clutch). The intelligent clutch (i-clutch) is configured to disconnect a prime mover and a driving shaft of the automobile.

Another aspect of the present invention relates to a method for optimizing kinetic energy for an automobile, the method comprising dynamically receiving, at a controller, one or more parameters from at least one of a braking pressure sensor, a speed sensor and a acceleration pressure sensor of the automobile. Next, the controller continuously determines an operating condition of the automobile based on the received one or more parameters. Subsequently, the controller generates a trigger based on the determined operating condition of the automobile to activate an intelligent clutch (i-clutch). The i-clutch disconnects a prime mover and a driving shaft of the automobile to optimize kinetic energy of the automobile.

Yet another aspect of the present invention relates to an automobile comprising an intelligent clutch (i-clutch) system. The i-clutch system further comprises a controller connected to an intelligent clutch (i-clutch) and at least one of a braking pressure sensor, a speed sensor and a acceleration pressure sensor of the automobile, said controller configured to dynamically receive one or more parameters from at least one of the braking pressure sensor, the speed sensor and the acceleration pressure sensor. The controller is further configured to continuously determine an operating condition of the automobile based on the received one or more parameters. The controller is further configured to generate a trigger based on the determined operating condition of the automobile to activate the i-clutch. The i-clutch is configured to disconnect a prime mover and a driving shaft of the automobile.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component.

FIG. 5 illustrates an exemplary method flow diagram [500] depicting method for optimizing kinetic energy for an automobile, in accordance with exemplary embodiments of the present invention.

DESCRIPTION OF INVENTION

Figure 1B:
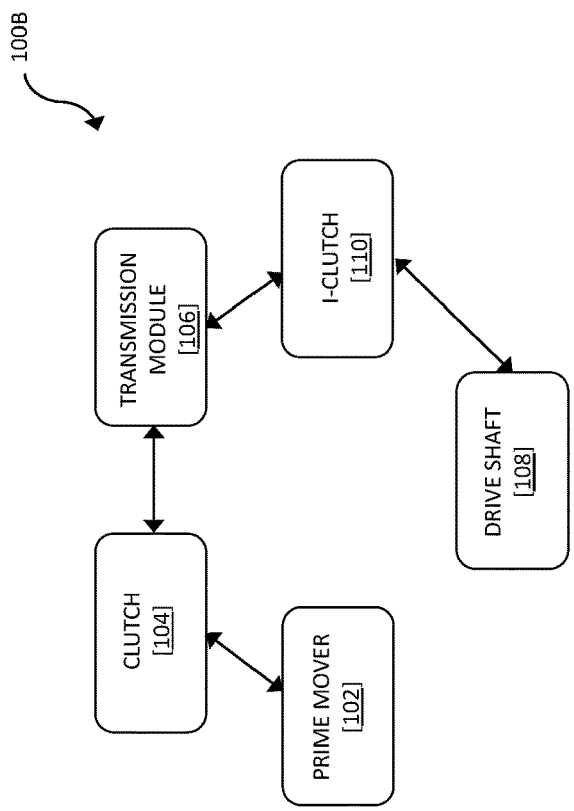
FIG. 1B illustrates an exemplary power transmission system unit [100B] for an IC engine vehicle with manual transmissions system, in accordance with exemplary embodiments of the present invention.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Example embodiments of the present invention are described below, as illustrated in various drawings in which like reference numerals refer to the same parts throughout the different drawings.

The ensuing description provides exemplary embodiments only, and is not intended to limit the scope, applicability, or configuration of the invention. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, components, processes, structures, and techniques may be shown without unnecessary detail in order to avoid obscuring the embodiments.

Also, it is noted that individual embodiments may be described as a process/method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements. In addition, the disclosed subject matter may be implemented as a method, apparatus, or article of manufacture using standard programming and/or engineering techniques to produce software, firmware, hardware, or any combination thereof to control a computer to implement the disclosed subject matter.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present invention. More specifically, the controller or control unit is a hardware processor that comprises a memory and a processor. The memory is configured to store the modules and the processor is specifically configured to execute said modules to perform one or more processes which are described further below.

As used herein, an "automobile", a "vehicle" or "vehicular" or other similar term is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1A:
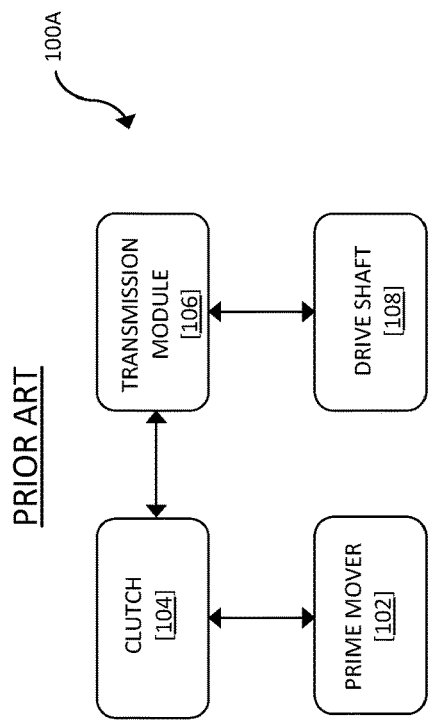
FIG. 1A illustrates an exemplary well-known power transmission system unit [100A] for an IC engine vehicle with manual transmissions system.

Referring to FIG. 1A, illustrates an exemplary well-known power transmission system unit [100A] for an internal combustion (IC) engine vehicle with manual transmissions system. The said power transmission system unit [100A] is an existing system describing the state of the art. The power transmission unit [100A] comprises of a prime mover [102], a clutch [104], a manual transmission module [106] and a drive shaft [108]. The said well-known components work in conjunction with each other according to move the vehicle by performing their well-known functions.

Hereinafter, exemplary embodiments of the present invention will be described in detail with reference to the accompanying drawings so that those skilled in the art can easily carry out the present invention.

The present invention relates to a method for optimization of kinetic energy in automobiles and an intelligent clutch (i-clutch) system for automobiles thereof. The present invention also encompasses an automobile comprising said i-clutch system. The method of the present invention, and the i-clutch system, is configured to add energy efficiency in automobiles and are suitable for deploying in all types of vehicles such as, but not limited to, automobiles using fossil fuels, run by electricity from batteries or hydrogen fuel cells or any kind of fossil fuels. The present invention is applicable to all types of automobiles operating on manual or automatic transmission systems. The i-clutch system is configured to add adaptability for the automobiles to all types of driving conditions such as but not limited to, wet, icy, slippery, gravelly, greasy, rainy or undulating surface to bring maximum energy efficiency to the automobiles while maintaining their safety aspects.

The present invention is useful to optimize kinetic energy suitable for or deploying in all types of vehicles such as, but not limited to, automobiles using fossil fuels, electricity from batteries, hydrogen fuel cells or any kind of fossil fuels including electrical vehicles. For instance, electrical vehicles use regeneration to recover some kinetic energy to charge batteries. The transmission system in electric vehicle potentially brings energy efficiency or mileage in electrical vehicles at par with highway driving, although regeneration in electric vehicles is not available at slow speed particularly at lower cut-off limit of regeneration 20-30 Kmph.

Referring to FIG. 1B illustrates an exemplary power transmission unit [100B] for an IC engine vehicle with manual transmissions system, in accordance with exemplary embodiments of the present invention. The power transmission unit [100] comprises of a prime mover [102], a clutch [104], a manual transmission module [106], an intelligent clutch (i-clutch) [110] further coupled to a drive shaft [108].

The present invention encompasses that the components are connected to each other, and work in conjunction to achieve the objectives of the present invention.

Figure 2:
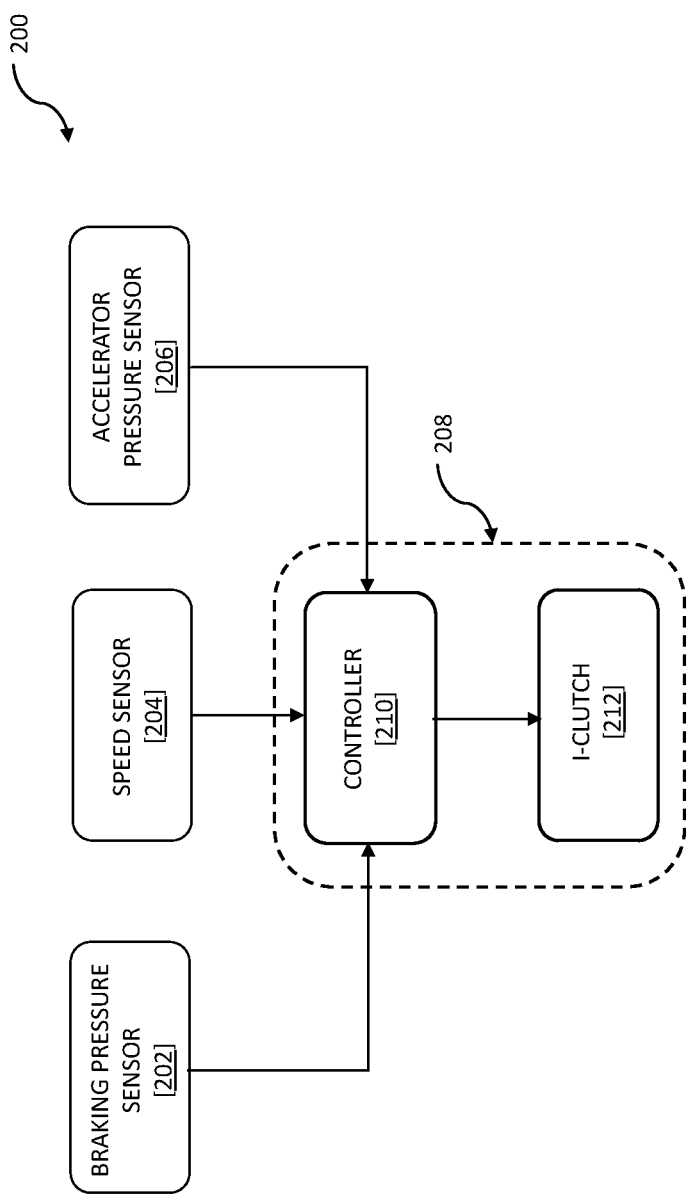
FIG. 2 illustrates an exemplary kinetic energy optimization system [200] for a vehicle, in accordance with exemplary embodiments of the present invention.

Referring to FIG. 2 illustrates an exemplary intelligent clutch (i-clutch) system [200] for an automobile for optimization of kinetic energy. The i-clutch system [200] comprises a controller [210] connected to an i-clutch [212] and at least one of a braking pressure sensor [202], a speed sensor [204] and an acceleration pressure sensor [206] of the automobile. The controller [210] is configured to dynamically receive one or more parameters from at least one of the braking pressure sensor [202], the speed sensor [204] and the acceleration pressure sensor [206]. The controller [210] is also configured to continuously determine an operating condition of the automobile based on the received one or more parameters. The controller [210] is also configured to generate a trigger based on the determined operating condition of the automobile to activate an intelligent clutch (i-clutch) [212]. The i-clutch [212] is configured to disconnect a prime mover and a driving shaft of the automobile upon activation. The controller [210] is further configured to generate a second trigger based on the determined operating condition of the automobile to deactivate the i-clutch [212].

The braking pressure sensor [202] is configured to measure amount of pressure on a braking paddle of the automobile. The expression 'braking paddle' may be interchangeably referred to 'braking pedal' hereinafter, which refers to a lever operated by one's foot that is used to control the brakes of the vehicle. The controller [210] is further configured to detect a braking of the automobile based on the one or more parameters received from the braking pressure sensor [202]. Thus, braking pressure sensor [202] aids in detection of the braking of the automobile. In an embodiment, braking pressure sensor [202] includes an accelerometer to detect physical forces indicative of braking of vehicle. In another embodiment of the present invention, braking pressure sensor [202] includes a connection to the vehicle bus of vehicle to detect an electronic indication that the brakes of vehicle are being applied. In yet another embodiment of the present invention, braking pressure sensor [202] includes a mechanical or optical sensor in proximity of the brake pedal or brake wire of vehicle to detect application of brakes. It will be apparent to a person skilled in the art that various ways of detecting the application of brakes of a vehicle are well known, and any such suitable scheme can be selected based on the type of vehicle, without deviating from the spirit and scope of the present invention.

In another embodiment, braking pressure sensor [202] provides a braking signal to the controller [210]. The controller [410] includes logic to process the braking signal. Upon activation, the controller [210] issues a control command to activate the i-clutch [212]. Further, in an embodiment of the present invention, the controller [210] selects one of the plurality of positions of i-clutch [212] based on the time and/or intensity of braking as determined from the braking signal from braking pressure sensor [202].

The speed sensor [204] of the present invention is configured to measure a speed of the vehicle. The controller [210] is further configured to receive the speed of the vehicle from the speed sensor and to compare the speed of the automobile with threshold values. In an exemplary embodiment of the present invention, the speed sensor [204] includes a speed measurement device. In another exemplary embodiment of the present invention, the speed sensor [204] includes a connection to the vehicle bus of vehicle to sense an electronic indication of the speed of vehicle. It will be apparent to a person skilled in the art that various ways of sensing the speed of a vehicle are well known, and any such suitable scheme can be selected based on the type of vehicle, without deviating from the spirit and scope of the present invention.

The acceleration pressure sensor [206] is configured to measure amount of pressure on an accelerator paddle of the automobile. The expression 'accelerator paddle' may be interchangeably referred to 'accelerator pedal' hereinafter, which refers to a lever operated by one's foot that is used to control the acceleration of the vehicle. The controller [210] is further configured to detect a release of the accelerator paddle of the automobile based on the one or more parameters received from the acceleration pressure sensor [206]. Further, in an embodiment, the i-clutch system [200] of the present invention may also have an additional accelerator acceleration pressure sensor [206] to measure pressure on the accelerator paddle.

Input received from the braking pressure sensor [202], the speed sensor [204] and the accelerator acceleration pressure sensor [206] are processed by the controller [210] to control the i-clutch [212]. the The controller [210] is configured to generate a trigger to activate the i-clutch [212] in an event the controller [210] determines the accelerator paddle is released, braking paddle is not pressed and the speed of the automobile is within the threshold values. Accordingly, upon activation, the i-clutch [212] is configured to disconnect the prime mover from the driving shaft automatically at the release of the accelerator. In another embodiment, the controller [210] is also configured to generate a second trigger to deactivate the i-clutch [212] in an event the controller [210] determines at least one of: the accelerator paddle is not released, braking paddle is pressed and the speed of the automobile is outside the threshold values. Accordingly, upon deactivation, the i-clutch [212] is configured to automatically connect the prime mover with the driving shaft.

In another instance, the i-clutch system [200] further comprises a switch connected to the i-clutch [212] and to the controller [210], said switch is configured to receive a user input to activate or deactivate the controller [210], and to transmit a trigger to the controller [210] based on the user input, wherein the controller [210] automatically activates or deactivates the i-clutch [212] upon receiving the trigger. In another instance, the switch is a remotely controlled switch.

In another exemplary embodiment of the present invention, the i-clutch system [200] implements models of machine learning and artificial intelligence to adapt to driving conditions automatically for the duration it remains active. The exemplary implementation of activation and deactivation of the i-clutch are further described in detail with reference to FIGS. 8-10. In another exemplary embodiment of the present invention, the control system [200] is configured to receive other operating conditions of a vehicle but not limited to pressure on the braking paddle, pressure of the accelerator, duration of braking, duration of accelerator to increase the efficiency.

The present invention also encompasses an automobile comprising an intelligent clutch (i-clutch) system. The intelligent clutch (i-clutch) system further comprises a controller [210] connected to at least one of a braking pressure sensor [202], a speed sensor [204] and an acceleration pressure sensor [206] of the automobile. The controller [210] is configured to dynamically receive one or more parameters from at least one of the braking pressure sensor [202], the speed sensor [204] and the acceleration pressure sensor [206]. The controller [210] is also configured to continuously determine an operating condition of the automobile based on the received one or more parameters. The controller [210] is also configured to generate a trigger based on the determined operating condition of the automobile to activate an intelligent clutch (i-clutch) [212]. The i-clutch system also comprises the intelligent clutch (i-clutch) connected to the controller [210], said i-clutch [212] configured to disconnect a prime mover and a driving shaft of the automobile. In another instance, the automobile further comprises a first clutch connected to the i-clutch [212], wherein the first clutch is automatically switched to a neutral position upon activation of the i-clutch [212].

Figure 3:
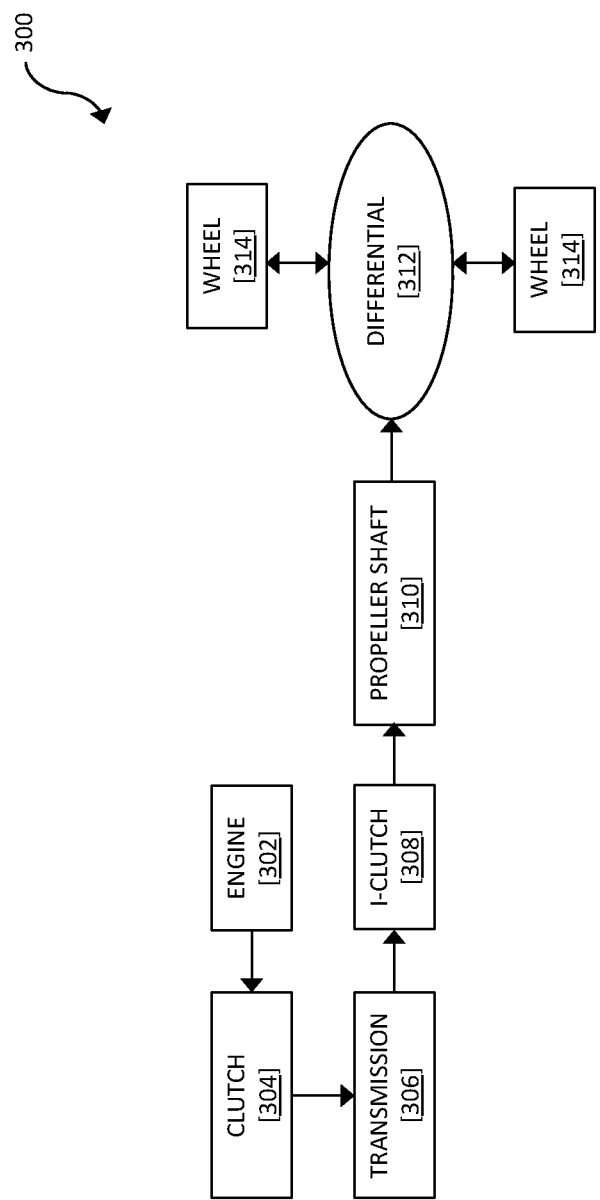
FIG. 3 illustrates an exemplary vehicle powertrain [200] with an intelligent clutch (i-clutch) system for a vehicle, in accordance with exemplary embodiments of the present invention.

Referring to FIG. 3 illustrates an exemplary vehicle powertrain [300] with an intelligent clutch (i-clutch) system for a vehicle, in accordance with exemplary embodiments of the present invention, comprising an engine [302], a clutch [304], a transmission [306], an i-clutch [308, 212], a propeller shaft [310], a differential [312] and wheels [314]. The present invention encompasses that all the components are connected together, and work in conjunction to achieve the objectives of the present invention. The engine [302], the clutch [304], the transmission [306], the propeller shaft [310], the differential [312] and the wheels [314] perform their functions in known manner. The invention encompasses that the i-clutch [308] is configured to automatically operate upon an accelerator of the vehicle being released by the driver of the vehicle.

The present invention further encompasses that the i-clutch [308] is enabled or disabled by the driver of the vehicle, whereby turning ON the switch enables the i-clutch [308], and accordingly, upon the accelerator being released by the driver of the vehicle, the i-clutch [308] is automatically activated. In operation, the i-clutch [308] disconnects the prime mover at the differential [312] from the driving shaft at the transmission [306] automatically at the release of accelerator to reduce the drag and retardation of the vehicles, thus, allowing the vehicle to cover more distance in the coasting mode. In yet another instance of the present invention, the i-clutch [308] is enabled or disabled by the driver of the vehicle using a remotely controlled switch.

Figure 4A:
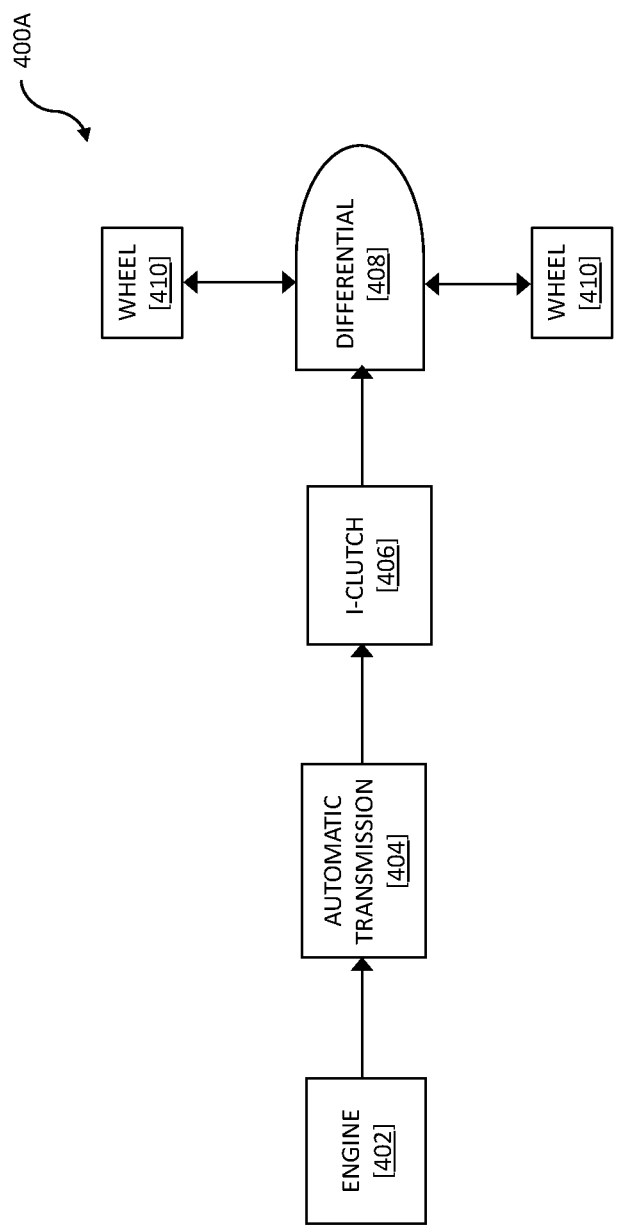
FIG. 4A illustrates an exemplary vehicle powertrain [400A] for an IC engine vehicle with automatic transmissions system and an intelligent clutch (i-clutch) system for a vehicle, in accordance with exemplary embodiments of the present invention.

FIG. 4A illustrates an exemplary vehicle powertrain [400A] for an IC engine vehicle with automatic transmissions system and an intelligent clutch (i-clutch) system for a vehicle, in accordance with exemplary embodiments of the present invention, comprising an engine [402], an automatic transmission [404], an i-clutch [406], a differential [408] and wheels [410]. The present invention encompasses that all the components are connected together, and work in conjunction to achieve the objectives of the present invention. The engine [402], the automatic transmission [404], the i-clutch [406], the differential [408] and the wheels [410] perform their functions in known manner. The invention encompasses that the i-clutch [406] is configured to automatically operate upon an accelerator of the vehicle being released by the driver of the vehicle.

The present invention further encompasses that the i-clutch [406] is configured to operate as a switch, whereby in the event the switch is activated, upon the accelerator being released by the driver of the vehicle, the i-clutch [406] is automatically activated. In operation, the i-clutch [408] disconnects the prime mover at the differential [408] from the driving shaft at the transmission [404] automatically at the release of accelerator to reduce the drag and retardation of the vehicles, thus, allowing the vehicle to cover more distance in the coasting mode.

Figure 4B:
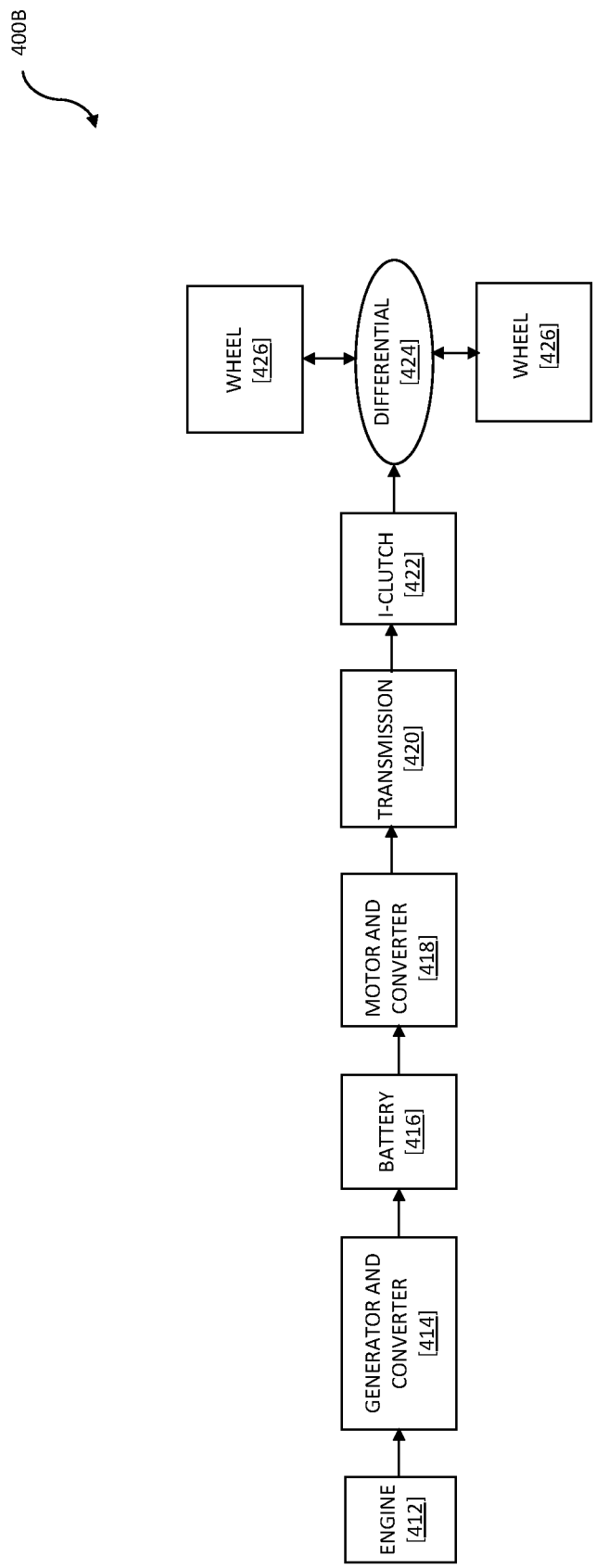
FIG. 4B illustrates an exemplary series electric and hybrid vehicles powertrain [400B] with intelligent clutch (i-clutch) for a hybrid vehicle, in accordance with exemplary embodiments of the present invention.

Referring to FIG. 4B illustrates an exemplary series electric and hybrid vehicles powertrain [400B] with intelligent clutch (i-clutch) for a hybrid vehicle, in accordance with exemplary embodiments of the present invention, comprising an engine [412], a generator and convertor [414], a battery [416], a motor and convertor [418], a transmission [420], an i-clutch [422], a differential [424] and drive wheels [426]. The present invention encompasses that all the components are connected together, and work in conjunction to achieve the objectives of the present invention. The engine [412], the generator and convertor [414], the battery [416], the motor and convertor [418], the transmission [420], the i-clutch [422], the differential [424] and the drive wheels [426] perform their functions in known manner. The invention encompasses that the i-clutch [406] is configured to automatically operate upon an accelerator of the vehicle being released by the driver of the vehicle.

The present invention further encompasses that the i-clutch [422] is configured to operate as a switch, whereby in the event the switch is activated, upon the accelerator being released by the driver of the vehicle, the i-clutch [422] disconnects the prime mover at the differential [424] from the driving shaft at the transmission [420], thus, stalling the motor and converter [418] automatically at the release of accelerator to reduce the drag and retardation of the vehicles, thus, allowing the vehicle to cover more distance in the coasting mode.

Figure 4C:
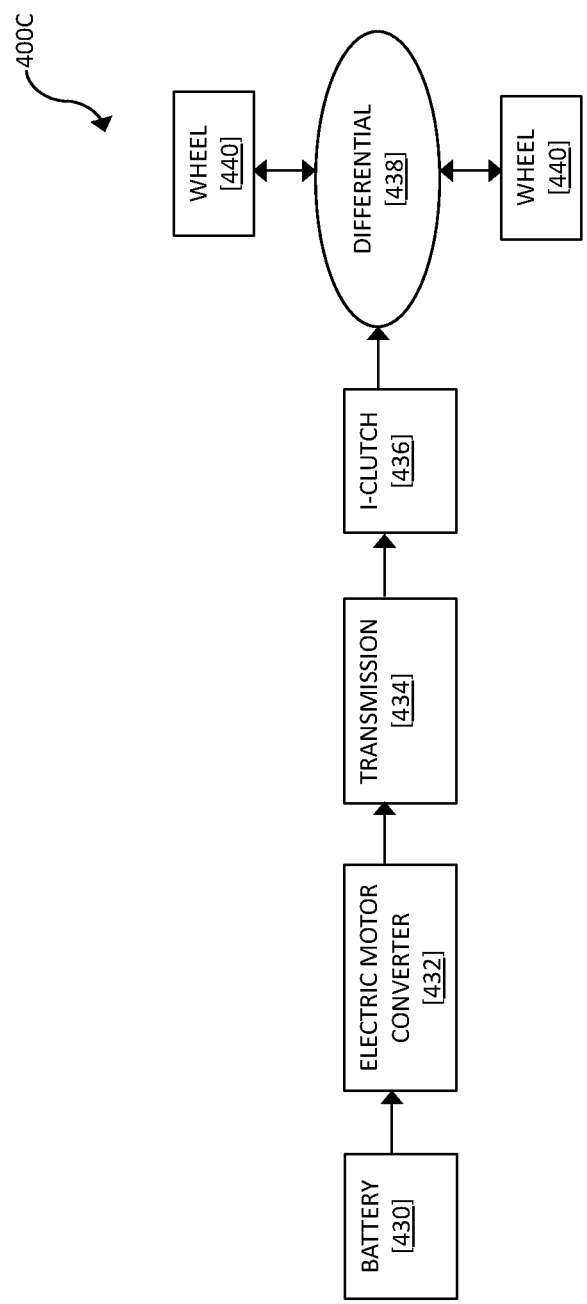
FIG. 4C illustrates an exemplary series electric vehicles powertrain [400C] with intelligent clutch (i-clutch) system for an electric vehicle, in accordance with exemplary embodiments of the present invention

Referring to FIG. 4C illustrates an exemplary series electric vehicles powertrain [400C] with intelligent clutch (i-clutch) system for an electric vehicle, in accordance with exemplary embodiments of the present invention, comprising a battery [430], an electric motor convertor [432], a battery [416], a transmission [434], an i-clutch [436], a differential [438] and drive wheels [440]. The present invention encompasses that all the components are connected together, and work in conjunction to achieve the objectives of the present invention. The battery [430], the electric motor convertor [432], the battery [416], the transmission [434], the i-clutch [436], the differential [438] and the drive wheels [440] perform their functions in known manner. The invention encompasses that the i-clutch [406] is configured to automatically operate upon an accelerator of the electric vehicle being released by the driver of the electric vehicle.

The present invention further encompasses that the i-clutch [436] is configured to operate as a switch, whereby in the event the switch is activated, upon the accelerator being released by the driver of the electric vehicle, the i-clutch [436] disconnects the prime mover at the differential [438] from the driving shaft at the transmission [434], thus, stalling the electric motor and converter [432] automatically at the release of accelerator to reduce the drag and retardation of the electric vehicle, thus, allowing the electric vehicle to cover more distance in the coasting mode.

The electric vehicles are known to use regeneration to recover kinetic energy of the electric vehicle to charge the batteries, however, the regeneration does not work at low speeds. For instance, typical lower cut-off limit for regeneration in an electric vehicle is 20-30 Kmph. In such case, the i-clutch [436] operates in the lower speed modes of the electric vehicles, and given that the electric vehicle provides lower mileage in the city or congested areas due to frequent braking, the i-clutch [436] improves the energy efficiency and mileage of the electric vehicle at par with highway driving.

In yet another exemplary instance of the present invention, the i-clutch [110, 212, 308, 406, 422, 436] of the present invention is controlled automatically to be used only when the vehicle is intended to be operated below specified speed limit every time the accelerator is released by the driver of the vehicle. The present invention further encompasses that other method like regenerative braking does not work below the specified speed limit.

Referring to FIG. 5 illustrates an exemplary method flow diagram [500] depicting method for optimizing kinetic energy for an automobile, in accordance with exemplary embodiments of the present invention. The method [500] starts at step [502]. At step [504], the method [500] comprises dynamically receiving, at a controller [210], one or more parameters from at least one of a braking pressure sensor [202], a speed sensor [204] and an acceleration pressure sensor [206] of the automobile.

Next, at step [506], the controller [210] continuously determines an operating condition of the automobile based on the received one or more parameters. Subsequently at step [508], the controller [210] generates a trigger based on the determined operating condition of the automobile to activate an intelligent clutch (i-clutch) [212]. Further next at step [510], the i-clutch [212] disconnects a prime mover and a driving shaft of the automobile to optimize kinetic energy of the automobile. The method ends at step [512].

In another instance, the method [500] encompasses that the controller [210] generates a trigger to activate the i-clutch [212] in an event the controller [210] determines the accelerator paddle is released, braking paddle is not pressed and the speed of the automobile is within the threshold values. The method [500] further comprises generating, by the controller [210], a second trigger based on the determined operating condition of the automobile to deactivate the i-clutch [212]. The method [500] further comprises that the controller [210] generates a second trigger to deactivate the i-clutch [212] in an event the controller [210] determines at least one of: the accelerator paddle is not released, braking paddle is pressed and the speed of the automobile is above the threshold value.

In another instance, the method further comprises receiving, at the controller [210], an amount of pressure on a braking paddle of the automobile from the braking pressure sensor [202]. Next, the controller [210] receives a speed of the automobile from the speed sensor [204]. Subsequently, the controller [210] receives an amount of pressure on an accelerator paddle of the automobile from the acceleration pressure sensor [206]. In another instance the present invention encompasses that the controller [210] receives information from the braking pressure sensor [202], the acceleration pressure sensor [206] and the speed sensor simultaneously.

The step of continuously determining, by the controller [210], an operating condition of the automobile of the method [500] further comprises detecting a release of the accelerator paddle of the automobile based on the one or more parameters received from the acceleration pressure sensor [206]. Next, the method [500] comprises detecting a braking of the automobile based on the one or more parameters received from the braking pressure sensor [202]. Subsequently, the method [500] comprises comparing the speed of the automobile within the threshold values.

Figure 6:
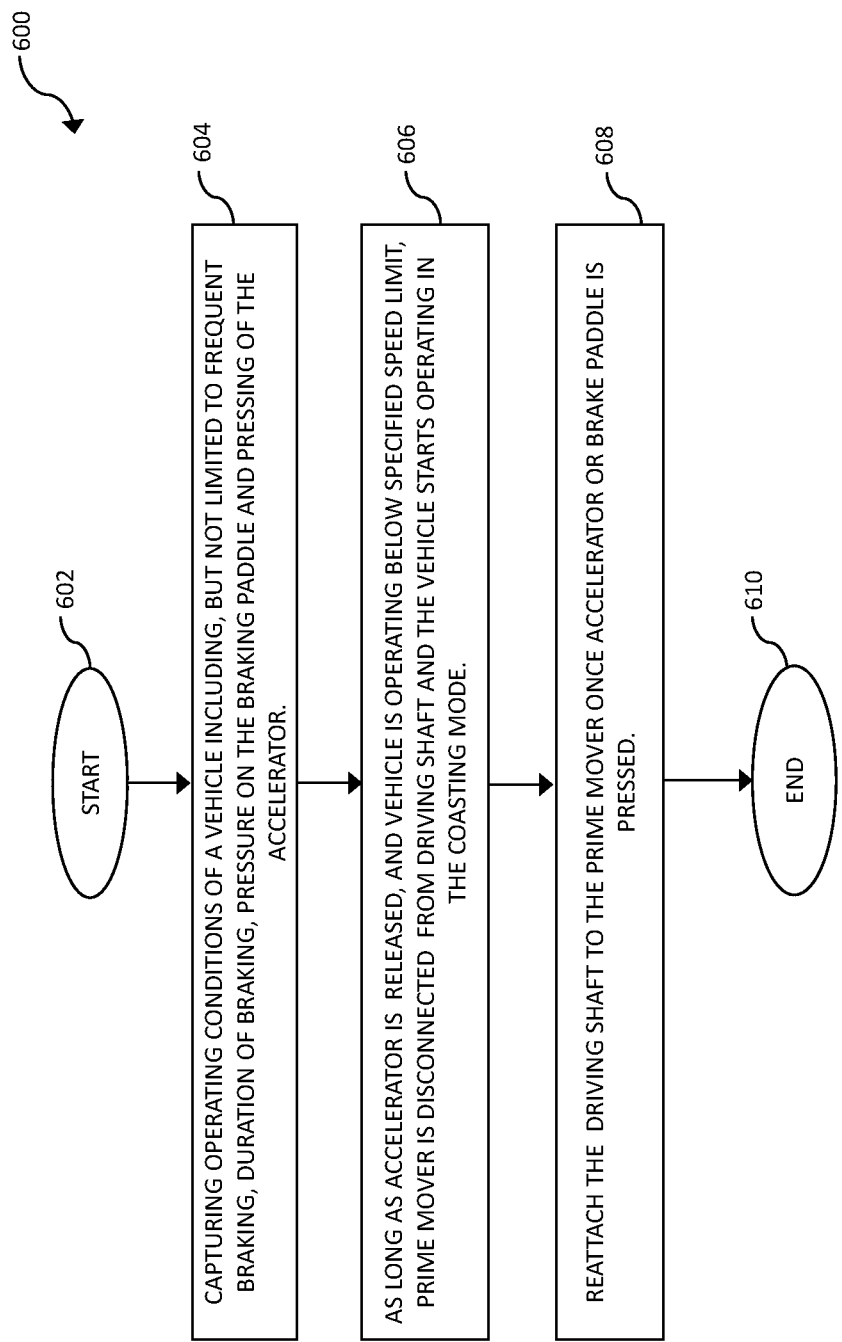
FIG. 6 illustrates another exemplary method flow diagram depicting method [600] illustrating operation of the invention for a vehicle, in accordance with exemplary embodiments of the present invention.

Referring to FIG. 6 illustrates an exemplary method flow diagram depicting method [600] illustrating operation of the invention for a vehicle, in accordance with exemplary embodiments of the present invention. The method initiates at step [602], when the vehicle is under operation and moving. At step [604], the controller [210] is configured to receive the operating conditions of a vehicle like frequent braking, duration of braking, pressure on the braking paddle and pressing of the accelerator. For instance, the controller [210] received inputs from the braking pressure sensor [202], the speed sensor [204] and the acceleration pressure sensor [206] are processed by the controller [210] to control the i-clutch [212].

In this regard, the present invention encompasses that the braking pressure sensor [202] is configured to detect the braking of vehicle and provides a braking signal to the controller [210]. The speed sensor [204] is configured to sense a speed of the vehicle and provides the speed measurement to the controller [210]. The acceleration pressure sensor [206] is configured to measure pressure on the braking paddle and provide pressure information to the controller [210].

At step [606], the present invention encompasses that as long as the accelerator is released, and the vehicle operates below specified speed limit, the i-clutch [212] disconnects the prime mover [102] from the driving shaft [108] and brings the vehicle in the coasting mode. Thus, the present invention encompasses maximum usage of the kinetic energy to cruise the vehicle during deceleration by disconnecting drive shaft [108] of the vehicle from the prime mover [102] of the vehicle as soon as the vehicle accelerator is released. In operation, the method [600] of the present invention encompasses that disconnecting the prime mover [102] from the driving shaft automatically at the release of accelerator will reduce drag and reduce retardation, thus, allowing the vehicle to cover more distance in this state of low drag.

Further, at step [608], the present invention encompasses that the driving shaft [108] is again reattached to the prime mover [102] once accelerator is pressed or if brake paddle is pressed to add to the decelerating force needed. In an exemplary embodiment of the present invention, the prime mover [102] is reattached to the driving shaft [108] if the brake paddle is pressed to add to the decelerating force needed reattach to driving shaft if brake paddle is pressed to add to the decelerating force needed. Thus, the method [600] finishes at step [510]. The present invention encompasses that the method [600] of the present invention is a dynamic process and that it shall be implemented at all times when the vehicle is operating below a certain speed, and the accelerator is released during the ride time of a driver. Since frequent braking and stoppage occur in the congested traffic, the automatic clutch system [408] of the present invention will add to the efficiency of the vehicle.

The method [600] of the present invention also encompasses that the controller [210] is also configured to receive information about the driving surface for the vehicle, like wet, rain, ice or undulating surface with the objective to maximize fuel efficiency by reducing wastage of kinetic energy. The controller [210], thus, also takes into account the driving surface information to control the i-clutch [212]. In an exemplary embodiment of an electric vehicle, as electric vehicles don't have any clutch, accordingly the i-clutch system [200] of the present invention shall be useful to augment its efficiency and extending its mileage capacity in any driving conditions. Especially in congested traffic, for example, electric vehicles use regenerative braking to recover some kinetic energy to charge batteries, however, such regeneration is not available at low speed with typical lower cut-off limit of regeneration is 20-30 Kmph. In such event, the i-clutch system [200] of the present invention shall be configured to operate at the lower speed operations of the electric vehicles. Thus, compared to an ordinary electric vehicle that gives lower mileage in the city or congested areas due to frequent braking, the i-clutch system

[200] of the present invention shall increase the energy efficiency or mileage of the electric vehicle to be at par with highway driving.

Figure 7:
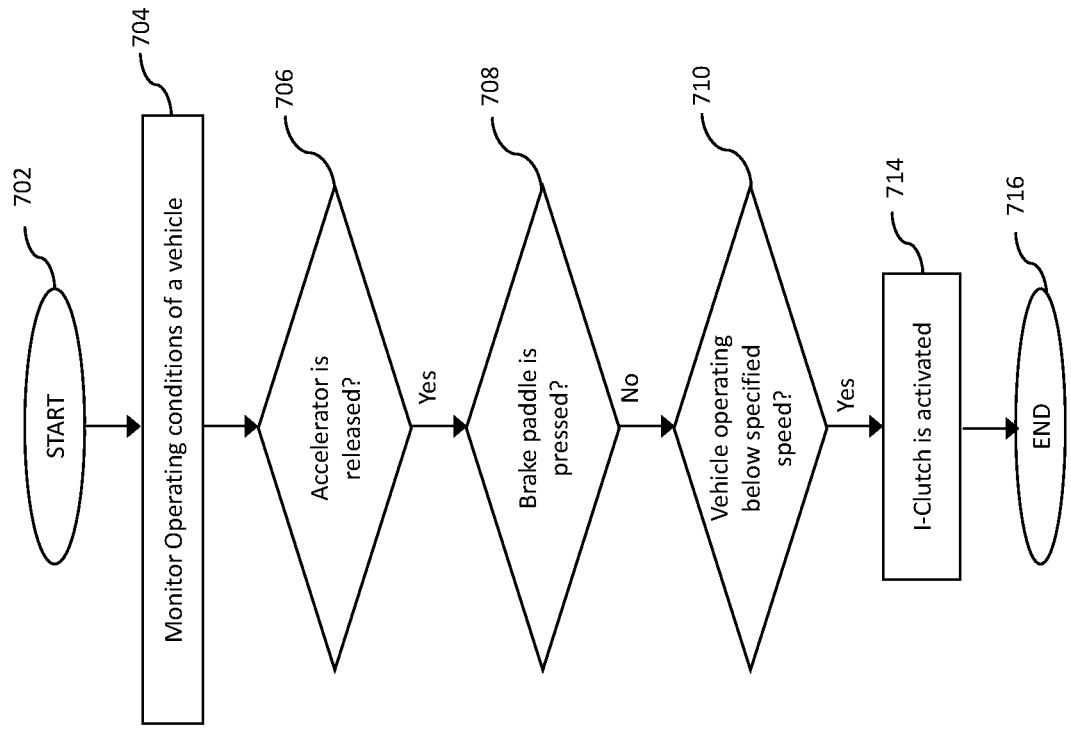
FIG. 7 illustrates an exemplary logic flow diagram [700] for activation of the i-clutch, in accordance with exemplary embodiments of the present invention.

Referring to FIG. 7 illustrates an exemplary logic flow diagram for activation of the i-clutch [212], in accordance with exemplary embodiments of the present invention. The method initiates at step [702], when the vehicle is under operation and moving. At step [704], the present invention encompasses that the controller [210] is dynamically monitoring operating conditions of the vehicle, and accordingly, the controller [210] is dynamically receiving inputs from the braking pressure sensor [202], the speed sensor [204] and the acceleration pressure sensor [206], etc.

In this regard, the present invention encompasses that at step [706] the controller [210] determines whether the accelerator of the vehicle has been released. In an event the accelerator has been released, the controller [210] determines whether the break paddle is pressed at step [708]. In an event the brake paddle has not been pressed, the controller [210] proceeds to determine whether the vehicle is operating below a specified speed limit, at step [710]. In an event the vehicle is operating below a specified speed limit, the controller [210] activates the i-clutch [212] at step [714]. Thus, the present invention encompasses that the vehicle must satisfy the above stated three conditions to successfully activate the i-clutch [212].

Figure 8:
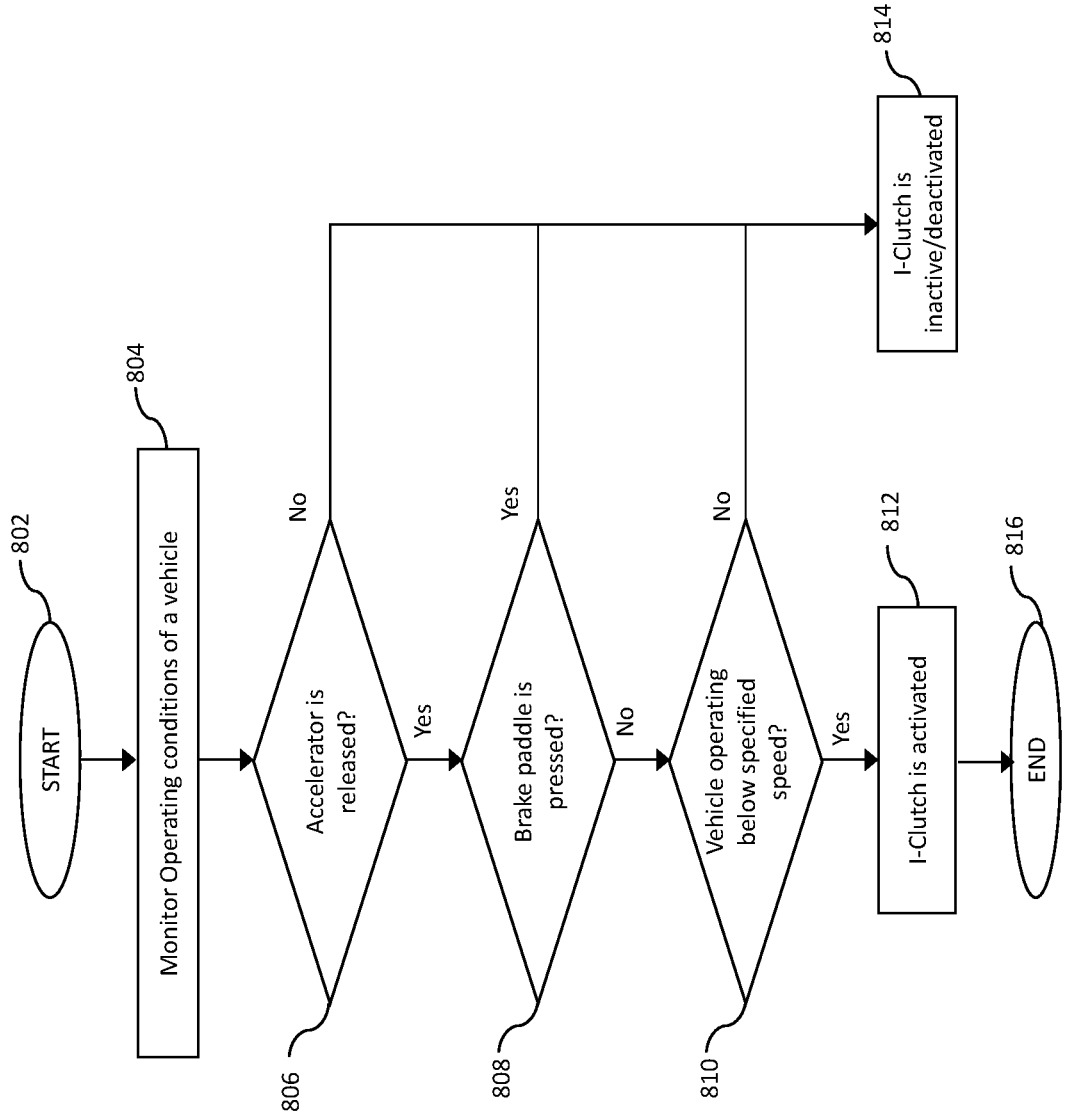
FIG. 8 illustrates an exemplary logic flow diagram [800] for de-activation of the i-Clutch, in accordance with exemplary embodiments of the present invention.

Referring to FIG. 8 illustrates an exemplary logic flow diagram for deactivation of the i-clutch [212], in accordance with exemplary embodiments of the present invention. The method initiates at step [802], when the vehicle is under operation and moving. At step [804], the present invention encompasses that the controller [210] is dynamically monitoring operating conditions of the vehicle, and accordingly, the controller [210] is dynamically receiving inputs from the braking pressure sensor [202], the speed sensor [204] and the acceleration pressure sensor [206], etc.

In this regard, the present invention encompasses that at step [806] the controller [210] determines whether the accelerator of the vehicle has been released. In an event the accelerator has not been released, the i-clutch [212] remains inactive [814]. In an event the accelerator has been released, the controller [210] determines whether the break paddle is pressed at step [808]. In an event the brake paddle has been pressed, the i-clutch [212] remains inactive [814]. In an event the brake paddle has not been pressed, the controller [210] proceeds to determine whether the vehicle is operating below a specified speed limit, at step [810]. In an event the vehicle is not operating below a specified speed limit, the i-clutch [212] remains inactive [814]. In an event the vehicle is operating below a specified speed limit, the controller [210] activates the i-clutch [212] at step [812].

Figure 9:
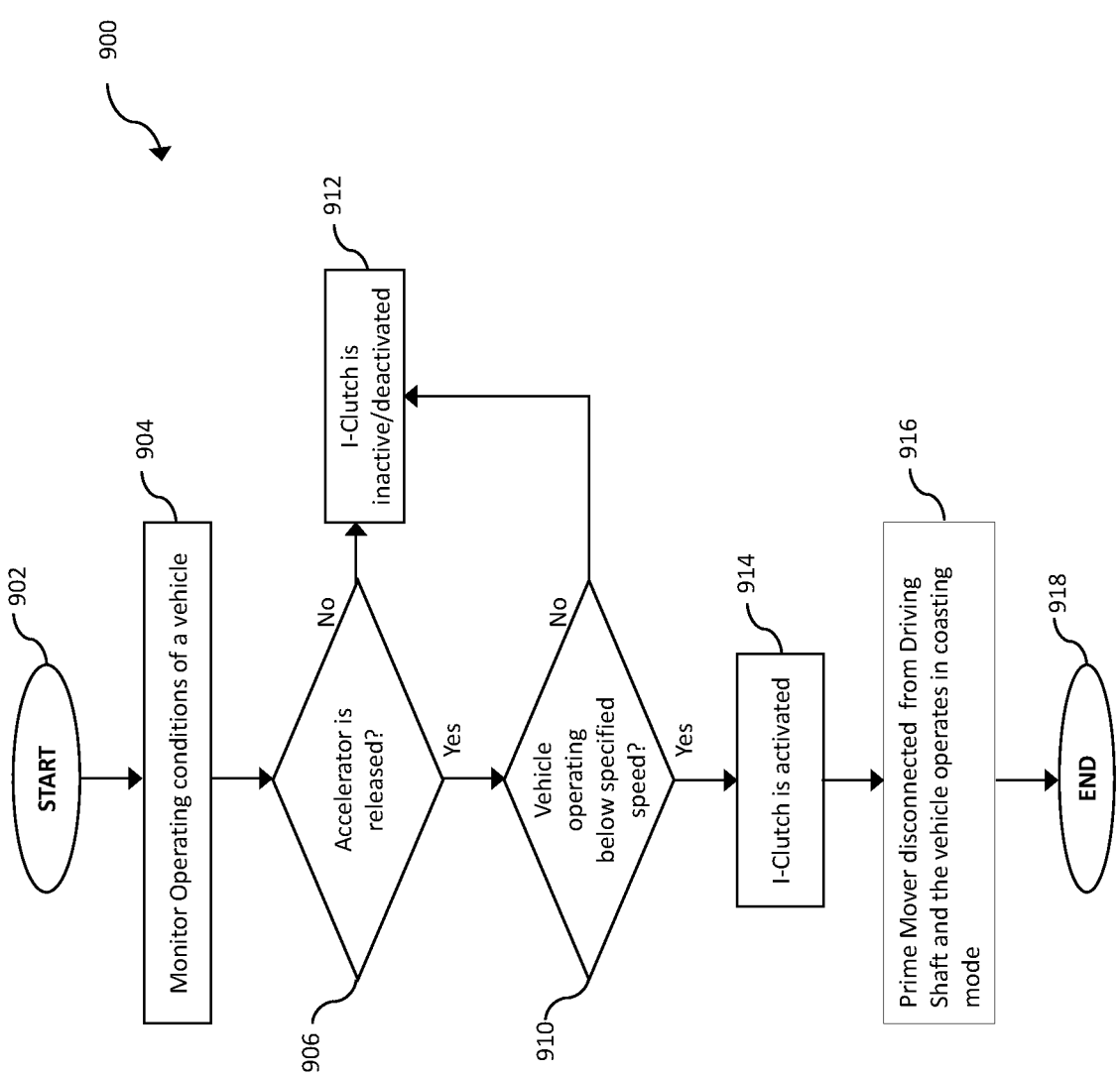
FIG. 9 illustrates an exemplary method flow diagram [900] depicting method for optimizing kinetic energy for an automobile, in accordance with exemplary embodiments of the present invention.

Referring to FIG. 9 illustrates another exemplary method flow diagram depicting method [900] illustrating operation of the invention for a vehicle, in accordance with exemplary embodiments of the present invention. The method initiates at step [902], when the vehicle is under operation and moving. At step [904], the controller [210] monitors the operating conditions of the vehicle like frequent braking, duration of braking, pressure on the braking paddle and pressing of the accelerator. For instance, the controller [210] is configured to receive inputs from the braking pressure sensor [202], the speed sensor [204] and the acceleration pressure sensor [206] are processed by the controller [210] to control the i-clutch [212].

In this regard, the present invention encompasses that at step [906] the controller [210] determines whether the accelerator of the vehicle has been released. In an event the accelerator has not been released, the i-clutch [212] remains inactive [912]. In an event the accelerator has been released, the method [900] further comprises the controller [210] determining whether the vehicle is operating below a specified speed limit, at step [910]. In an event the vehicle is not operating below a specified speed limit, the i-clutch [212] remains inactive [912]. In an event the vehicle is operating below a specified speed limit, the method [900] further comprises activating the i-clutch [212] by the controller [210] at step [914].

At step [916], the present invention encompasses that as long as the accelerator is released, and the vehicle operates below specified speed limit, the i-clutch [212] disconnects the prime mover [102] from the driving shaft [108] and brings the vehicle in the coasting mode. In operation, the method [900] of the present invention encompasses that disconnecting the prime mover [102] from the driving shaft automatically at the release of accelerator will reduce drag and reduce retardation, thus, allowing the vehicle to cover more distance in this state of low drag. Thus, the method [900] finishes at step [918].

The present invention encompasses a dynamic method for optimizing kinetic energy, and accordingly, in an event the accelerator of the vehicle is pressed after the said release at any time during the implementation of the method, the i-clutch [212] shall remain inactive or shall be deactivated. Accordingly, in an event the brake paddle of the vehicle is pressed at anytime during the implementation of the method, the i-clutch [212] shall remain inactive or shall be deactivated. Accordingly, in an event the speed of the vehicle increases above the specified speed limit at any time during the implementation of the method, the i-clutch [212] shall remain inactive or shall be deactivated. Thus, the present invention encompasses that the vehicle failing to satisfy at least one of the above stated three conditions results into the i-clutch [212] being inactive/deactivated.

Although the present invention has been described as a sequence of steps in a series, it shall be appreciated by those skilled in the art that two or more consecutive steps of the method might be executed simultaneously within the scope of the present invention.

Various embodiments of the present invention offer many advantages.

Firstly, the present invention operates in the conditions where operations of the vehicle is inherently in-efficient especially at slow speed and congested areas plagued with frequent braking and low speed.

Secondly, the present invention reduces the time of the engine needed to produce torque by reducing drag on the drive shaft. Resultantly, the system of the present invention consumes lower energy and hence, are very useful in the conventional IC engines or electric vehicles thereof.

Thirdly, the present invention is applicable in all types of vehicle irrespective of the type of fuel used including fossil fuel, electric as well as hydrogen or fuel cells including electrical vehicles.

Fourthly, present invention allows usage of kinetic energy into useful work rather than converting it into chemical or electrical energy on the automobiles which is otherwise wasted in friction braking.

Fifthly, the present invention helps the automobile to adapt itself to the various conditions of the driving surface can be overridden by the driver any time during driving with a simple operation like a switch.

The invention has been described in detail with reference to exemplary embodiments thereof.

However, it will be appreciated by those skilled in the art that changes may be made in these exemplary embodiments without departing from the principles and spirit of the invention, the scope of which is defined in the appended claims and their equivalents.

Although the present invention has been described with reference to certain preferred embodiments and examples thereof, other embodiments and equivalents are possible. Even though numerous characteristics and advantages of the present invention have been set forth in the foregoing description, together with functional and procedural details, the invention is illustrative only, and changes may be made in detail, within the principles of the invention to the full extent indicated by the broad general meaning of the terms. Thus, various modifications are possible of the presently disclosed system and process without deviating from the intended scope and spirit of the present invention. Accordingly, in one embodiment, such modifications of the presently disclosed a system and method for determining and indicating the efficiency of an electric vehicle are included in the scope of the present invention.

We claim:

1. An intelligent clutch (i-clutch) system for an automobile, said i-clutch system comprising:
   a controller [210] connected to at least one of a braking pressure sensor [202], a speed sensor [204] and an acceleration pressure sensor [206] of the automobile, said controller configured to:
      dynamically receive one or more parameters from at least one of the braking pressure sensor [202], the speed sensor [204] and the acceleration pressure sensor [206],
      continuously determine an operating condition of the automobile based on the received one or more parameters,
      generate a trigger based on the determined operating condition of the automobile to activate an intelligent clutch (i-clutch) [212]; and
   the i-clutch [212] connected to the controller [210], said i-clutch [212] configured to disconnect a prime mover and a driving shaft of the automobile upon activation, by disconnecting a transmission and the driving shaft of the automobile,
   wherein the controller [210] is further configured to generate a second trigger based on the determined operating condition of the automobile to deactivate the i-clutch [212].

2. The i-clutch system as claimed in claim 1, wherein:
   the braking pressure sensor [202] is configured to measure an amount of pressure on a braking pedal of the automobile;
   the speed sensor [204] is configured to measure a speed of the automobile; and
   the acceleration pressure sensor [206] is configured to measure an amount of pressure on an accelerator pedal of the automobile.

3. The i-clutch system as claimed in claim 2, wherein the controller [210] is further configured to:
   detect a release of the accelerator pedal of the automobile based on the one or more parameters received from the acceleration pressure sensor [206];
   detect a braking of the automobile based on the one or more parameters received from the braking pressure sensor [202]; and
   comparing the speed of the automobile with a plurality of threshold values.

4. The i-clutch system as claimed in claim 3, wherein the controller [210] is configured to:
   generate a trigger to activate the i-clutch [212] in an event the controller [210] determines the accelerator pedal is released, braking pedal is not pressed and the speed of the automobile is within the threshold values, and
   generate a second trigger to deactivate the i-clutch [212] in an event the controller [210] determines at least one of: the accelerator pedal is not released, braking pedal is pressed or the speed of the automobile is outside the plurality of threshold values.

5. The i-clutch system as claimed in claim 1, further comprising a switch connected to the i-clutch [212] and to the controller [210], said switch configured to:
   receive a user input to activate or deactivate the controller [210], and
   transmit a trigger to the controller [210] based on the user input, wherein the controller automatically activates or deactivates the i-clutch [212] upon receiving the trigger.

6. The i-clutch system as claimed in claim 5, wherein the switch is a remotely controlled.

7. A method for optimizing kinetic energy for an automobile, the method comprising:
   dynamically receiving, at a controller [210], one or more parameters from at least one of a braking pressure sensor [202], a speed sensor [204] and an acceleration pressure sensor of the automobile;
   continuously determining, by the controller [210], an operating condition of the automobile based on the received one or more parameters;
   generating, by the controller [210], a trigger based on the determined operating condition of the automobile to activate an intelligent clutch (i-clutch) [212];
   disconnecting, by the i-clutch [212], a prime mover and a driving shaft of the automobile to optimize kinetic energy of the automobile, by disconnecting a transmission and the driving shaft of the automobile; and
   generating, by the controller [210], a second trigger based on the determined operating condition of the automobile to deactivate the i-clutch [212].

8. The method as claimed in claim 7, the method further comprising:
   receiving, at the controller [210], an amount of pressure on a braking pedal of the automobile from the braking pressure sensor [202];
   receiving, at the controller [210], a speed of the automobile from the speed sensor [204]; and
   receiving, at the controller [210], an amount of pressure on an accelerator pedal of the automobile from the acceleration pressure sensor [206].

9. The method as claimed in claim 8, wherein continuously determining, by the controller [210], an operating condition of the automobile further comprises:
   detecting a release of the accelerator pedal of the automobile based on the one or more parameters received from the acceleration pressure sensor [206];
   detecting a braking of the automobile based on the one or more parameters received from the braking pressure sensor [202]; and
   comparing the speed of the automobile within the plurality of threshold values.

10. The method as claimed in claim 9, wherein:
   the controller [210] generates a trigger to activate the i-clutch [212] in an event the controller [210] determines the accelerator pedal is released, braking pedal is not pressed and the speed of the automobile is within the threshold values, and the controller [210] generates a second trigger to deactivate the i-clutch [212] in an event the controller [210] determines at least one of: the accelerator pedal is not released, braking pedal is pressed or the speed of the automobile is above the threshold value.

11. The automobile as claimed in claim 7, further comprising a switch connected to the controller [210], said switch configured to:

receive a user input to activate or deactivate the controller [210], and transmit a trigger to the controller [210] based on the user input, wherein the controller automatically activates or deactivates the i-clutch [212] upon receiving the trigger.

12. The automobile as claimed in claim 11, wherein the switch is remotely controlled.

13. An automobile comprising:

an intelligent clutch (i-clutch) system further comprising:

connected to at least one of a braking pressure sensor [202], a speed sensor [204] and an acceleration pressure sensor [206] of the automobile, said controller [210] configured to:

dynamically receive one or more parameters from at least one of the braking pressure sensor [202], the speed sensor [204] and the acceleration pressure sensor [206], continuously determine an operating condition of the automobile based on the received one or more parameters, and generate a trigger based on the determined operating condition of the automobile to activate an intelligent clutch (i-clutch) [212]; and the intelligent clutch (i-clutch) [212] connected to the controller [210], said i-clutch configured to disconnect a prime mover and a driving shaft of the automobile, by disconnecting a transmission and the driving shaft of the automobile, wherein the controller [210] is further configured to generate a second trigger based on the determined operating condition of the automobile to deactivate the i-clutch [212].

14. The automobile as claimed in claim 13, wherein:

the braking pressure sensor [202] is configured to measure an amount of pressure on a braking pedal of the automobile;

the speed sensor [204] is configured to measure a speed of the automobile; and the acceleration pressure sensor [206] is configured to measure an amount of pressure on an accelerator pedal of the automobile.

15. The automobile as claimed in claim 14, wherein the controller [210] is further configured to:

detect a release of the accelerator pedal of the automobile based on the one or more parameters received from the acceleration pressure sensor [206];

detect a braking of the automobile based on the one or more parameters received from the braking pressure sensor [202]; and comparing the speed of the automobile is within a plurality of threshold values.

16. The automobile as claimed in claim 15, wherein the controller [210] is configured to:

Generate a trigger to activate the i-clutch [212] in an event the controller [210] determines the accelerator pedal is released, braking pedal is not pressed and the speed of the automobile is within the plurality of threshold values; and Generate a second trigger to deactivate the i-clutch [212] in an event the controller [210] determines at least one of: the accelerator pedal is not released, braking pedal is pressed or the speed of the automobile is within the plurality of threshold values.

17. The automobile as claimed in claim 16, further comprising a first clutch configured to disconnect the prime mover and the driving shaft of the automobile upon activation, by disconnecting the prime mover from the transmission.

* * * * *